US007930744B2

(12) United States Patent
Teller et al.

(10) Patent No.: US 7,930,744 B2
(45) Date of Patent: Apr. 19, 2011

(54) METHODS FOR HOOKING APPLICATIONS TO MONITOR AND PREVENT EXECUTION OF SECURITY-SENSITIVE OPERATIONS

(75) Inventors: Tomer Teller, Tel Aviv (IL); Idan Nahoum, Givatayim (IL); Tamir Zegman, Holon (IL)

(73) Assignee: Check Point Software Technologies Ltd., Tel Aviv (IL)

( * ) Notice: Subject to any disclaimer, the term of this patent is extended or adjusted under 35 U.S.C. 154(b) by 481 days.

(21) Appl. No.: 12/166,341

(22) Filed: Jul. 2, 2008

(65) Prior Publication Data

US 2010/0005528 A1 Jan. 7, 2010

(51) Int. Cl.
*G06F 11/00* (2006.01)

(52) U.S. Cl. ........................................... 726/22; 726/23

(58) Field of Classification Search .............. 726/22–30; 713/164–165, 167, 176; 717/121, 126
See application file for complete search history.

(56) References Cited

U.S. PATENT DOCUMENTS

| | | | | |
|---|---|---|---|---|
| 6,721,941 | B1 * | 4/2004 | Morshed et al. | 717/127 |
| 7,571,448 | B1 * | 8/2009 | Sallam | 719/331 |

* cited by examiner

*Primary Examiner* — Hosuk Song
(74) *Attorney, Agent, or Firm* — Mark M. Friedman

(57) ABSTRACT

The present invention discloses methods and media for hooking applications to monitor and prevent execution of security-sensitive operations, the method including the steps of: reading at least one configuration parameter list from a configuration module; hooking, by a hooking engine, a hooking point in an application, wherein the hooking point is defined in the configuration module; calling, by the application, the hooking point during operation of the application; matching at least one hooking parameter in the hooking point to at least one configuration parameter in at least one configuration parameter list; and upon detecting a match between the hooking parameter and at least one configuration parameter, performing at least one configuration-defined action. Preferably, the method further includes the step of: updating a state of the hooking engine. Preferably, the hooking engine is operative to prevent malicious operations by obfuscated code.

17 Claims, 2 Drawing Sheets

METHODS FOR HOOKING APPLICATIONS TO MONITOR AND PREVENT EXECUTION OF SECURITY-SENSITIVE OPERATIONS

FIELD AND BACKGROUND OF THE INVENTION

The present invention relates to methods for generic hooking of computer applications in order to monitor and prevent execution of security-sensitive operations.

The exposure of computer systems to malicious attacks threatens the integrity of secure data storage and transactions. Today's attacks have become very sophisticated. For example, consider a simple JavaScript code extract that originally reads as follows:

```
<html>
    <SCRIPT Language = "javascript">
    Ctrl = new ActiveXObject("VisualFoxPro.Application");
    Ctrl.ExecuteRequest("This    function    will    crash    the    browser
    AAAAAAAAAAAAAAAAAAAAAAAAAAAAAAAAAAAAAAAAAAAAAA")
    </SCRIPT>
</html>
```

The above code exploits a known vulnerability in Microsoft Internet Explorer (CVE-2007-4790), and will crash the browser as soon as the user visits a malicious website containing the code.

In order to bypass inspection by security applications, such a script could be modified to read as:

```
<html>
    <SCRIPT Language = "javascript">
    Var a = "VisualFoxPro";
    Var b = ".Application";
    Ctrl = new ActiveXObject(a+b);
    Ctrl.ExecuteRequest("This    function    will    crash    the    browser
    AAAAAAAAAAAAAAAAAAAAAAAAAAAAAAAAAAAAAAAAAAAAAA")
    </SCRIPT>
</html>
```

This simple example is easy for an attacker to create, and can foil all existing security tools that are currently known.

In other words, by using string concatenation, an attacker can bypass all known pattern-matching security applications. Moreover, such a code will also bypass any network-based IDS/IPS/Firewall without detection. Current system-security techniques are unable to handle such obfuscated code, and cannot protect JavaScript code (and other scripted languages) appropriately.

Even in the absence of code obfuscation, it is much more convenient to inspect Web scripts and other code as late as possible, provided security is maintained, in order for the security software to have access to the complete and accurate run-time state of the code being inspected.

It would be desirable to have methods for generic hooking of computer applications in order to monitor and prevent execution of security-sensitive operations.

SUMMARY OF THE INVENTION

It is the purpose of the present invention to provide generic hooking of computer applications in order to monitor and prevent execution of security-sensitive operations. The terms "obfuscation" and "obfuscated code" are used herein to refer to programming languages (including compiled, interpreted, and scripting languages).

An aspect of the present invention is to enable obfuscated code to be inspected inside web browsers. Such inspection is achieved by hooking into the browser's script interpreter, and reading the resulting clear-text buffers. Hooking (see for example: http://en.wikipedia.org/wiki/Hooking) is a common programming technique. It is used by many applications, including Check Point Ltd.'s SSL Network Extender (SNX) application mode and ForceField. For SNX and ForceField, specific, hard-coded function calls are hooked in order to limit or secure the functionality of the application being hooked into. In the case of ForceField, the application is a web browser.

Generic hooking can be implemented using one of several freely-available hooking libraries (see for example: http://en.wikipedia.org/wiki/Hooking). Some libraries support more than one programming language. Hooking is also common in the context of language (and pseudocode) interpreters. For example, Java allows a programmer to extend the standard Class Loader. Such a capability is often used for hooking specific method calls (e.g. by SNX for Linux).

In preferred embodiments of the present invention, inspection code is hooked into a browser at the appropriate location. By doing so, before the code interprets the script, the script is sent through the "hooked" code, and can be inspected using a modified IPS (Intrusion Prevention System) signature database. Such methods yield a detection rate that is much better than a network-based IPS. Moreover, the false-positive rate is also lower than in a network-based IPS, since the entire HTML page is not scanned. Matching is only performed under a specific context, and only the relevant function call is searched for a problematic pattern.

Embodiments of the present invention apply not only to interpreted script code (although the exemplary embodiment described below involves a JavaScript code caption), since many other vulnerabilities in the browser can be detected and prevented by hooking. Such vulnerabilities include, for example, attacks related to rendering of HTML code or JPEG images.

Therefore, according to the present invention, there is provided for the first time a method for hooking applications to monitor and prevent execution of security-sensitive operations, the method including the steps of: (a) reading at least one configuration parameter list from a configuration module; (b) hooking, by a hooking engine, a hooking point in an application, wherein the hooking point is defined in the configuration module; (c) calling, by the application, the hooking point during operation of the application; (d) matching at least one hooking parameter in the hooking point to at least one configuration parameter in at least one configuration parameter list; and (e) upon detecting a match between the hooking parameter and at least one configuration parameter, performing at least one configuration-defined action.

Preferably, at least one configuration parameter list is at least one list selected from the group consisting of: a context list and a signature list.

More preferably, at least one configuration parameter is a signature.

Most preferably, the signature is selected from the group consisting of: a simple string, a regular expression, an interpreted-language code snippet, a compiled code, a standard-format signature.

More preferably, at least one configuration parameter is a context, wherein the context is used to define at least one part of at least one function argument to be matched.

Most preferably, the match is based on the context.

Preferably, at least one configuration-defined action is an action selected from the group consisting of: aborting the application, prompting a user, logging an event, bypassing a function associated with the hooking point, and consulting a database for instructions.

Preferably, the method further includes the step of: (f) updating a state of the hooking engine.

Preferably, the hooking engine is operative to prevent malicious operations by obfuscated code.

According to the present invention, there is provided for the first time a computer-readable storage medium having computer-readable code embodied therein for hooking applications to monitor and prevent execution of security-sensitive operations, the computer-readable code including: (a) program code for reading at least one configuration parameter list in a configuration module; (b) program code for hooking, by a hooking engine, a hooking point in an application, wherein the hooking point is defined in the configuration module; (c) program code for calling, by the application, the hooking point during operation of the application; (d) program code for matching at least one hooking parameter in the hooking point to at least one configuration parameter in at least one configuration parameter list; and (e) program code for, upon detecting a match between the hooking parameter and at least one configuration parameter, performing at least one configuration-defined action.

Preferably, at least one configuration parameter list is at least one list selected from the group consisting of: a context list and a signature list.

More preferably, at least one configuration parameter is a signature.

Most preferably, the signature is selected from the group consisting of: a simple string, a regular expression, an interpreted-language code snippet, a compiled code, a standard-format signature.

More preferably, at least one configuration parameter is a context, wherein the context is used to define at least one part of at least one function argument to be matched.

Most preferably, the match is based on the context.

Preferably, at least one configuration-defined action is an action selected from the group consisting of: aborting the application, prompting a user, logging an event, bypassing a function associated with the hooking point, and consulting a database for instructions.

Preferably, the computer-readable code further includes: (f) program code for updating a state of the hooking engine.

Preferably, the hooking engine is operative to prevent malicious operations by obfuscated code.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods for generic hooking of computer applications in order to monitor and prevent execution of security-sensitive operations. The principles and operation for hooking applications for such purposes, according to the present invention, may be better understood with reference to the accompanying description and the drawings.

Figure 1:
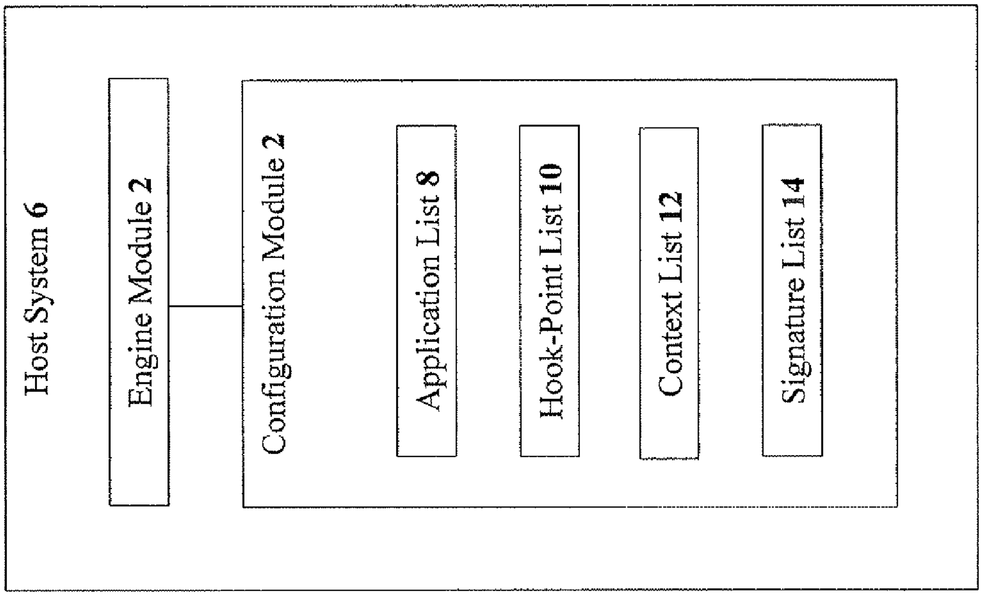
FIG. 1 is a simplified schematic block diagram of the components of a code-inspection hooking program, according to preferred embodiments of the present invention.

Referring now to the drawings, FIG. 1 is a simplified schematic block diagram of the components of a code-inspection hooking program, according to preferred embodiments of the present invention. A hooking engine module 2 and a configuration module 4 are shown in a host system 6. Configuration module 4 includes: an application list 8, a hook-point list 10, a context list 12, and a signature list 14. Application list 8 includes the names of the applications for which incoming code is designated to be hooked.

Hook-point list 10 includes a name (e.g. a function name, or a unique code artifact by which the function can be identified) and a type for each hook point. By supporting multiple types of hook points, a robust detection system is enabled. Such support handles both functions that are explicitly exported from a DLL and those that are not.

Contexts in context list 12 can be the argument or arguments of the hooked function which are security-sensitive, and need to be inspected. For example, the context can be the first argument in a JavaScript interpreter method invoking an ActiveX object. In this example, the context (i.e. the argument) represents the name or UID (unique identification) of the type of ActiveX object being invoked.

In a simpler implementation, contexts (i.e. the function parameters to be inspected) may not be explicitly configured. Instead, contexts can be hard-coded into hooking engine module 2.

A signature in signature list 14 is applied to each context. The signatures are modified IDS (Intrusion Detection System)/IPS signatures which include: (1) a pattern to be matched, and (2) an action to be performed upon a successful match. When a match occurs several actions are possible, for example: engine module 2 can abort the application, engine module 2 can return from the invoking function with an error code, engine module 2 can prompt the user, and/or engine module 2 can log an error message.

There are various types of signatures. A signature can be more general than a simple string or a simple regular expression (as are used by antivirus and IPS products). Examples of signatures include the following.

Simple strings (a string matches a buffer if the string is contained in the buffer)

Regular expressions (normal regular expression matching)

Interpreted or compiled language code snippet (the code is run on the buffer; if the code returns a certain value, a match is indicated)

Other common types of signature formats (e.g. standard formats used by IPS products)

Engine module 2 searches for the target function (i.e. the hook point) inside the target DLL using the function's unique pattern, and adds a hook function that has access to the original function's parameters. The hook function can inspect the parameters, and act upon their values. Engine module 2 and configuration module 4 are updateable.

An exemplary embodiment is used to describe a combined definition of a hook point, a context and a malicious-code signature.

```
<ConfigurationItem>
    <HookPoint>
        <Application> IE </Application>
        <DLL> mshtml.dll </DLL>
        <Function> newActiveXObject </Function>
        <FunctionType>
            typedef (WINAPI * ActiveX)(int a, SAFEARRAY c);
        </FunctionType>
    </HookPoint>
    <Context> c->Buffer </Context>
    <Signature>
        <Pattern> "VisualFoxpro.Application" </Pattern>
        <Action> prompt </Action>
    </Signature>
<ConfigurationItem>
```

In the exemplary embodiment above, the function "newActiveXObject" is hooked. The hook code identifies the creation of the "VisualFoxPro.Application" ActiveX object by matching the clear-text buffer which holds the object's name in the configured pattern. When such a match occurs, the hook code prompts the user. Most of the signature patterns can be derived automatically from an IPS database (e.g. Check Point Ltd.'s SmartDefense security database).

Figure 2:
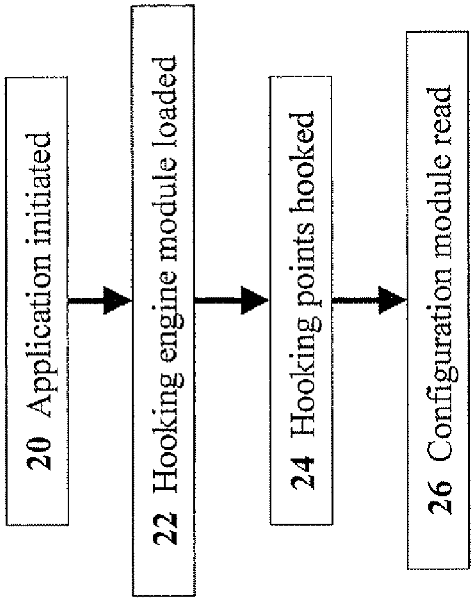
FIG. 2 is a simplified flowchart of the major operational steps for application initialization of the code-inspection hooking program of FIG. 1, according to preferred embodiments of the present invention.

FIG. 2 is a simplified flowchart of the major operational steps for application initialization of the code-inspection hooking program of FIG. 1, according to preferred embodiments of the present invention. An application (e.g. Internet browser) is initiated (Step 20). Hooking engine module 2 is then loaded (Step 22). Alternatively, the application can be modified to initiate hooking engine module 2 whenever the application starts. Hooking engine module 2 hooks to the hooking points in hook-point list 10 (Step 24). Hooking engine module 2 then reads other configurations from configuration module 4, including contexts from contexts list 12 and signatures from signatures list 14, for example (Step 26).

Figure 3:
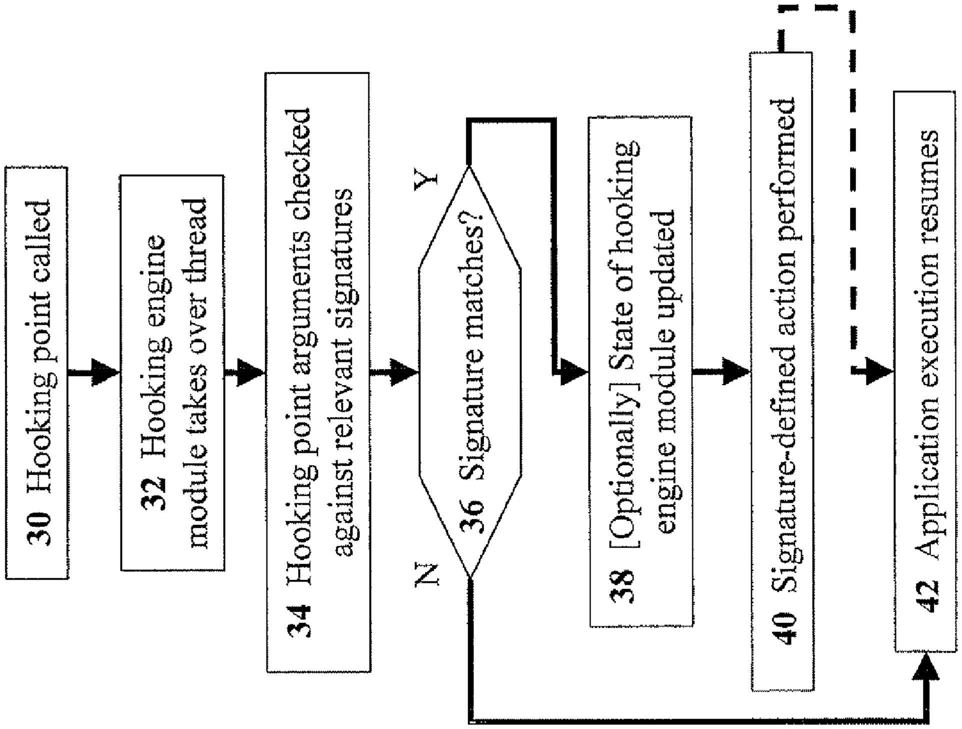
FIG. 3 is a simplified flowchart of the major operational steps for application run-time operation of the code-inspection hooking program of FIG. 1, according to preferred embodiments of the present invention.

FIG. 3 is a simplified flowchart of the major operational steps for application run-time operation of the code-inspection hooking program of FIG. 1, according to preferred embodiments of the present invention. The application's hooking point is called (Step 30). Hooking engine module 2 then takes control of the running thread (Step 32). Hooking point arguments are checked against all relevant signatures (Step 34). It is then determined whether there is a match with the signature (Step 36). If a signature matches, optionally, the state of hooking engine module 2 is updated, if the matching signatures alter the state (Step 38). Then, a signature-defined action is performed (Step 40). If no signature matches in Step 36, then execution of the main application resumes (Step 42).

The signature-defined action can include, for example: aborting the application, prompting the user, logging the event, bypassing the hooked functions and consulting an external on-line database for instructions (which may be any of the above actions). According to the signature-defined action in Step 38, execution of the main application may resume (Step 42). Updates for hooking engine module 2 and configuration module 4 can be periodic, user-triggered, or administrator-triggered.

While the invention has been described with respect to a limited number of embodiments, it will be appreciated that many variations, modifications, and other applications of the invention may be made.

What is claimed is:

1. A method for hooking applications to monitor and prevent execution of security-sensitive operations, the method comprising the steps of:

(a) reading at least one configuration parameter list from a configuration module;

(b) hooking, by a processor of a host system, a hooking point in an application, wherein said hooking point is defined in said configuration module;

(c) calling, by said application, said hooking point during operation of said application;

(d) matching, by said processor, at least one hooking parameter in said hooking point to at least one configuration parameter, that includes a signature, in said at least one configuration parameter list; and (e) upon detecting a match between said hooking parameter and at least one configuration parameter, performing, by said processor, at least one configuration-defined action.

2. The method of claim 1, wherein said at least one configuration parameter list is at least one list selected from the group consisting of: a context list and a signature list.

3. The method of claim 2, wherein said matching of said at least one hooking parameter, includes matching to at least one other configuration parameter, that includes a context, wherein said context is used to define at least one part of at least one function argument to be matched.

4. The method of claim 3, wherein said match is based on said context.

5. The method of claim 1, wherein said signature is selected from the a group consisting of: a simple string, a regular expression, an interpreted-language code snippet, a compiled code, a standard-format signature.

6. The method of claim 1, wherein said at least one configuration-defined action is an action selected from the group consisting of: aborting said application, prompting a user, logging an event, bypassing a function associated with said hooking point, and consulting a database for instructions.

7. The method of claim 1, the method further comprising the step of:

(f) updating a state of said hooking engine.

8. The method of claim 1, wherein said hooking engine is operative to prevent malicious operations by obfuscated code.

9. A computer-readable storage medium having computer-readable code embodied therein for hooking applications to monitor and prevent execution of security-sensitive operations, the computer-readable code comprising:

(a) program code for reading at least one configuration parameter list in a configuration module;

(b) program code for hooking, by a hooking engine, a hooking point in an application, wherein said hooking point is defined in said configuration module;

(c) program code for calling, by said application, said hooking point during operation of said application;

(d) program code for matching at least one hooking parameter in said hooking point to at least one configuration parameter, that includes a signature, in said at least one configuration parameter list; and (e) program code for, upon detecting a match between said hooking parameter and at least one configuration parameter, performing at least one configuration-defined action.

10. The storage medium of claim 9, wherein said at least one configuration parameter list is at least one list selected from the group consisting of: a context list and a signature list.

11. The storage medium of claim 10, wherein said matching of said at least one hooking parameter, includes matching to at least one other configuration parameter, that includes a context, wherein said context is used to define at least one part of at least one function argument to be matched.

12. The storage medium of claim 11, wherein said match is based on said context.

13. The storage medium of claim 9, wherein said signature is selected from the a group consisting of: a simple string, a regular expression, an interpreted-language code snippet, a compiled code, a standard-format signature.

14. The storage medium of claim 9, wherein said at least one configuration-defined action is an action selected from the group consisting of: aborting said application, prompting a user, logging an event, bypassing a function associated with said hooking point, and consulting a database for instructions.

15. The storage medium of claim 9, the computer-readable code further comprising:

(f) program code for updating a state of said hooking engine.

16. The storage medium of claim 9, wherein said hooking engine is operative to prevent malicious operations by obfuscated code.

17. A method for hooking applications to monitor and prevent execution of security-sensitive operations, the method comprising the steps of (a) reading at least one configuration parameter list from a configuration module;

(b) hooking, by a processor of a host system, a hooking point in an application, wherein said hooking point is defined in said configuration module;

(c) calling, by said application, said hooking point during operation of said application;

(d) matching, by said processor, at least one hooking parameter in said hooking point to at least one configuration parameter, that includes a context, in said at least one configuration parameter list; wherein said context is used to define at least one part of at least one function argument to be matched; and (e) upon detecting a match between said hooking parameter and at least one configuration parameter, performing, by said processor, at least one configuration-defined action.

* * * * *

UNITED STATES PATENT AND TRADEMARK OFFICE

CERTIFICATE OF CORRECTION

PATENT NO. : 7,930,744 B2
APPLICATION NO. : 12/166341
DATED : April 19, 2011
INVENTOR(S) : Tomer Teller et al.

It is certified that error appears in the above-identified patent and that said Letters Patent is hereby corrected as shown below:

Column 6

Claim 5 line 53 should be corrected as follows:
Change
-- from the a group --
to
"from a group"

Column 7

Claim 13 line 29 should be corrected as follows:
Change
-- is selected from the a group --
to
"is selected from a group"

Signed and Sealed this
Twenty-sixth Day of July, 2011

David J. Kappos
*Director of the United States Patent and Trademark Office*